United States Patent
Åstrand et al.

(10) Patent No.: US 9,860,928 B2
(45) Date of Patent: Jan. 2, 2018

(54) PAIRING CONSUMER ELECTRONIC DEVICES USING A CROSS-BODY COMMUNICATIONS PROTOCOL

(71) Applicant: Sony Corporation, Tokyo (JP)

(72) Inventors: Per Åstrand, Lund (SE); Henrik Bengtsson, Lund (SE); Aleksandar Rodzevski, Malmö (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 218 days.

(21) Appl. No.: 14/382,380

(22) PCT Filed: Mar. 12, 2014

(86) PCT No.: PCT/IB2014/059680
§ 371 (c)(1),
(2) Date: Sep. 2, 2014

(87) PCT Pub. No.: WO2015/083012
PCT Pub. Date: Jun. 11, 2015

(65) Prior Publication Data
US 2016/0286587 A1    Sep. 29, 2016

Related U.S. Application Data

(60) Provisional application No. 61/942,753, filed on Feb. 21, 2014, provisional application No. 61/912,223, filed on Dec. 5, 2013.

(51) Int. Cl.
*H04M 1/66* (2006.01)
*H04M 1/68* (2006.01)
(Continued)

(52) U.S. Cl.
CPC .......... *H04W 76/023* (2013.01); *G06F 21/32* (2013.01); *G06F 21/34* (2013.01); *G06F 21/35* (2013.01);
(Continued)

(58) Field of Classification Search
CPC ... H04W 76/023; H04W 4/008; H04W 8/005; H04W 12/06; H04B 13/005; H04L 43/10; H04L 67/141; H04M 1/7253
(Continued)

(56) References Cited

U.S. PATENT DOCUMENTS 6,580,356 B1    6/2003   Alt et al.
7,202,773 B1 *  4/2007   Oba .................. G07C 9/00007
                                                  340/5.8
(Continued)

FOREIGN PATENT DOCUMENTS

EP    1596538 A1    11/2005
EP    2018038 A2    1/2009
(Continued)

OTHER PUBLICATIONS

International Search Report dated May 21, 2014 in re International Application No. PCT/IB2014/059680 filed Mar. 12, 2014.
(Continued)

*Primary Examiner* — Marceau Milord
(74) *Attorney, Agent, or Firm* — Tucker Ellis LLP (57) ABSTRACT

A wireless device, such as a mobile device, for example, pairs with a peripheral device, such as a wristlet, for example, worn by the user. One or both of the wireless device and the peripheral device, each of which contact the user's skin, determine whether the other is in contact with the body of the same user. If both devices are in contact with the same body, the devices will pair with each other.

27 Claims, 10 Drawing Sheets

(51) Int. Cl.

| | | |
|---|---|---|
| H04M 3/16 | (2006.01) | |
| H04W 76/02 | (2009.01) | |
| H04B 7/26 | (2006.01) | |
| H04B 13/00 | (2006.01) | |
| H04L 29/06 | (2006.01) | |
| H04W 12/06 | (2009.01) | |
| G06F 21/34 | (2013.01) | |
| G06F 21/35 | (2013.01) | |
| G07C 9/00 | (2006.01) | |
| H04L 9/32 | (2006.01) | |
| H04L 9/08 | (2006.01) | |
| H04W 4/00 | (2009.01) | |
| G06F 21/32 | (2013.01) | |
| H04L 12/26 | (2006.01) | |
| H04M 1/725 | (2006.01) | |
| B60R 25/20 | (2013.01) | |
| H04W 8/00 | (2009.01) | |

(52) U.S. Cl.
CPC ...... *G07C 9/00111* (2013.01); *G07C 9/00309* (2013.01); *H04B 7/26* (2013.01); *H04B 13/005* (2013.01); *H04L 9/0827* (2013.01); *H04L 9/3215* (2013.01); *H04L 43/10* (2013.01); *H04L 63/0853* (2013.01); *H04L 63/0861* (2013.01); *H04M 1/7253* (2013.01); *H04W 4/008* (2013.01); *H04W 12/06* (2013.01); *B60R 25/2027* (2013.01); *G07C 2009/00809* (2013.01); *H04L 63/18* (2013.01); *H04L 2209/805* (2013.01); *H04L 2209/88* (2013.01); *H04W 8/005* (2013.01)

(58) Field of Classification Search
USPC .......................................................... 455/411
See application file for complete search history.

(56) References Cited

U.S. PATENT DOCUMENTS

| | | | | |
|---|---|---|---|---|
| 7,777,719 B2* | 8/2010 | Zhao | .................. | G06F 3/011 345/156 |
| 7,822,983 B2* | 10/2010 | Aull | .................. | G06F 21/35 380/270 |
| 8,253,693 B2* | 8/2012 | Buil | .................. | H04B 13/005 345/1.1 |
| 8,600,373 B2* | 12/2013 | Moallemi | .................. | H04B 1/7163 455/414.1 |
| 8,867,064 B2* | 10/2014 | Higashi | .................. | G06F 21/35 358/1.15 |
| 8,867,995 B2* | 10/2014 | Kim | .................. | H04B 13/005 345/163 |
| 8,912,879 B2* | 12/2014 | Fyke | .................. | G06F 21/35 340/5.1 |
| 9,000,914 B2* | 4/2015 | Baker | .................. | A61B 5/0002 340/5.22 |
| 9,306,628 B2* | 4/2016 | Konanur | .................. | H04B 5/0031 |
| 9,332,377 B2* | 5/2016 | Agardh | .................. | H04W 4/008 |
| 9,351,100 B2* | 5/2016 | Tarnhed | .................. | H04W 4/008 |
| 9,489,511 B2* | 11/2016 | Rodzevski | .................. | G06F 21/35 |
| 9,591,682 B2* | 3/2017 | .ANG.strand | .................. | G07C 9/00309 |
| 2005/0008148 A1 | 1/2005 | Jacobson | | |
| 2005/0015604 A1 | 1/2005 | Sundararajan et al. | | |
| 2005/0243061 A1 | 11/2005 | Liberty et al. | | |
| 2007/0145119 A1 | 6/2007 | Rhelimi | | |
| 2007/0254728 A1* | 11/2007 | Moallemi | .................. | H04B 1/7163 455/574 |
| 2007/0281721 A1* | 12/2007 | Lee | .................. | H04W 8/005 455/502 |
| 2007/0282783 A1 | 12/2007 | Singh | | |
| 2008/0259043 A1 | 10/2008 | Buil et al. | | |
| 2009/0034591 A1* | 2/2009 | Julian | .................. | H04W 4/206 375/220 |
| 2009/0094681 A1 | 4/2009 | Sadler et al. | | |
| 2010/0277435 A1 | 11/2010 | Han et al. | | |
| 2011/0205156 A1 | 8/2011 | Gomez et al. | | |
| 2011/0221590 A1* | 9/2011 | Baker | .................. | A61B 5/0002 340/539.12 |
| 2012/0026129 A1 | 2/2012 | Kawakami | | |
| 2012/0133605 A1 | 5/2012 | Tanaka | | |
| 2012/0242501 A1* | 9/2012 | Tran | .................. | A61B 5/0024 340/870.02 |
| 2012/0249409 A1 | 10/2012 | Toney et al. | | |
| 2012/0324368 A1 | 12/2012 | Putz et al. | | |
| 2013/0017789 A1 | 1/2013 | Chi et al. | | |
| 2013/0147605 A1 | 6/2013 | Chang et al. | | |
| 2013/0174049 A1 | 7/2013 | Townsend et al. | | |
| 2014/0003636 A1 | 1/2014 | Bodvarsson et al. | | |
| 2014/0085050 A1 | 3/2014 | Luna | | |
| 2014/0136414 A1 | 5/2014 | Abhyanker | | |
| 2014/0247148 A1* | 9/2014 | Proud | .................. | H02J 7/025 340/870.02 |
| 2014/0325614 A1* | 10/2014 | Rhelimi | .................. | H04W 12/06 726/4 |
| 2015/0068069 A1* | 3/2015 | Tran | .................. | H04B 1/385 36/136 |
| 2015/0162994 A1 | 6/2015 | Rodzevski et al. | | |
| 2015/0163221 A1 | 6/2015 | Bolin et al. | | |
| 2015/0285659 A1 | 10/2015 | Curtis et al. | | |
| 2016/0174025 A1 | 6/2016 | Chaudhri et al. | | |

FOREIGN PATENT DOCUMENTS

| | | |
|---|---|---|
| EP | 2378748 A1 | 10/2011 |
| EP | 2600319 A1 | 6/2013 |
| JP | 2008073462 A | 4/2008 |
| JP | 2009049951 A | 3/2009 |
| WO | 2011021531 A1 | 2/2011 |

OTHER PUBLICATIONS

Kwak, K. et al., "An Overview of IEEE 802.15.6 Standard", Invited Paper, Feb. 20, 2011, pp. 1-6. Retrieved on Aug. 21, 2014, retrieved from internet: arxiv.org/pdf/1102.4106.

Bionym, "The Nymi", White Paper, Nov. 19, 2013, pp. 1-28.

* cited by examiner

PAIRING CONSUMER ELECTRONIC DEVICES USING A CROSS-BODY COMMUNICATIONS PROTOCOL

TECHNICAL FIELD

The present disclosure relates generally to wireless communication devices, and particularly to cellular telephones configured to communicate with a consumer electronic device worn on a user's wrist or hand using the user's own body as a communications medium.

BACKGROUND

There is an emerging consumer market for certain devices that are used as companion products to smartphone devices. Their popularity can be traced, in part, to the variety of features they provide to a user. For example, one such device is a wearable device, such as a ring worn on the user's finger, a necklace, glasses, or a "wristlet" (e.g., a watch or wristband) that is worn around a user's wrist. Typically, such wearable devices may provide different features, such as a logging function that monitors the user's motion and resting activities, and then sends a report on the detected motion and activities to the user's smartphone for storage in memory. Another feature allows the wearable devices to be used as a personal token to automatically gain access to a smartphone that has been locked. Particularly, a wearable device worn by the user may communicate with the user's smartphone, thereby permitting the user to bypass the manual entry of a predetermined unlock sequence associated with the smartphone.

Such features are already present on commercial products. However, a common issue associated with these devices is that they either need a physical interface (e.g., 3.5 mm audio plug, an Universal Serial Bus (USB), etc.), or some sort of wireless "local connectivity" (e.g., BLUETOOTH, WiFi, Near Field Communication (NFC), etc.), in order to transmit data between the devices. Such methods for communicating, however, can be cumbersome. Additionally, these types of communication may be a limiting factor that could constrain new features waiting to be implemented on such devices.

There are existing solutions utilizing such local connectivity technologies such as BLUETOOTH/BLE and WiFi in order to detect a wristlet in close proximity to a smartphone. However, these methods are not able to accurately measure a distance and establish a deterministic distance between the wristlet and the smartphone. Typically, different materials positioned near the wristlet and the smartphone can interfere with (i.e., signal attenuation) and reflect (i.e., signal gain) the wireless communications between the two devices. Similarly, under some extreme conditions, other transmitting devices or signals can also interfere with the communications. Thus, such solutions are not able to provide accurate distance detection making it difficult for a smartphone to determine if a wristlet or other wearable device is or is not within a predetermined, preferably short-range, distance.

SUMMARY

The present disclosure provides wireless devices (e.g., a wearable device such as a wristlet and a smartphone) and a corresponding method for initializing and pairing a short-range Body Area Network (BAN) communications link between the wireless devices. More specifically, the wireless devices are associated with a user, and are configured to employ the user's own body as a transmission medium to communicate at least some of the signals and data required to "BAN pair" the wireless devices (i.e., pair the two devices using the user's own body as a communications medium). The devices and method described herein provide a secure and reliable manner in which to transmit the sometimes sensitive data required to BAN pair the wireless devices that are in physical contact with the user's body, but are separated from each other by a short distance (e.g., wrist-to-hand distance). Particularly, with the method disclosed herein, the wireless devices can more accurately detect each other's presence when both devices are in physical contact with the body of the same user. That is, each wireless device, when in contact with a user's body, is able to accurately determine whether the other wireless device is also currently contacting the user's body (e.g., the same user is wearing the wristlet and holding the smartphone). So informed, the wireless devices begin BAN pairing and initializations operations with each other.

Accordingly, in one embodiment, the present disclosure provides a method for pairing a wireless communication device with a peripheral device using a Body Area Network (BAN). In this embodiment, the method performed at the wireless communication device and comprises detecting that a peripheral device is proximate a wireless communication device, determining whether both the wireless communication device and the peripheral device are in contact with a user's body, and pairing with the peripheral device using a BAN if both the wireless communication device and the peripheral device are in contact with the user's body.

In one embodiment, pairing with the peripheral device using a BAN if both the wireless communication device and the peripheral device are in contact with the user's body comprises generating a key based on a unique identifier received over a first communication link from the peripheral device, transmitting the generated key to the peripheral device over the first communication link, receiving the key from the peripheral device over a second communication link, and pairing with the peripheral device if the key received over the second communication link is a valid key.

In some embodiments, the second communication link comprises a Body Area Network (BAN) link that uses the user's body as a transmission medium.

In one embodiment, the method further comprises activating a receiver associated with the BAN link responsive to transmitting the key to the peripheral device over the first communication link, listening on the BAN link to receive the key from the peripheral device, and determining that both the wireless communication device and the peripheral device are in contact with the body of the user responsive to receiving the key over the BAN link during a predetermined time interval.

In one embodiment, the method further comprises requesting the unique identifier from the peripheral device if both the wireless communication device and the peripheral device are in contact with the user's body.

Additionally, in one embodiment, the unique identifier comprises a hardware identifier associated with the peripheral device. In such cases, generating the key comprises inputting the hardware identifier into a predefined hash function, and storing a hash code output by the hash function as the key in a memory circuit at the wireless communication device.

In one embodiment, the second communication link comprises a Body Area Network (BAN) link that uses the user's body as a transmission medium. In these cases, determining whether both the wireless communication device and the peripheral device are in contact with a user's body further comprises sending a request to the peripheral device to ping the wireless communication device over the BAN link, receiving the ping from the peripheral device over the BAN link, and determining that both the wireless communication device and the peripheral device are in contact with the user's body responsive to receiving the ping.

In some embodiments, the method further comprises prompting the user to indicate whether to BAN pair with the peripheral device responsive to receiving the ping, and sending the key to the peripheral device if the user indicates to BAN pair with the peripheral device.

In one embodiment, the method further comprises sending one or more commands over the BAN link to selectively enable and disable a BAN transmitter at the peripheral device.

In one embodiment, the wireless communication device is configured to display a passcode lock screen to the user. In these cases, the method further comprises bypassing the passcode lock screen responsive to determining that both the wireless communication device and the peripheral device are in contact with the user's body.

According to another embodiment, the present disclosure also provides a wireless communication device comprising a communications interface circuit and a processor circuit. The communications interface circuit communicates data and signals with a peripheral device disposed proximate the wireless communication device. The processor circuit determines whether both the wireless communication device and the peripheral device are in contact with a user's body, and pairs with the peripheral device using a Body Area Network (BAN) if both the wireless communication device and the peripheral device are in contact with the user's body.

In one embodiment, the processor circuit is configured to generate a key based on a unique identifier received over a first communication link from the peripheral device, transmit the generated key to the peripheral device over the first communication link, receive the key from the peripheral device over a second communication link, and pair with the peripheral device if the key received over the second communication link is a valid key.

In one embodiment, the second communication link comprises a Body Area Network (BAN) link that uses the user's body as a transmission medium.

In one embodiment, the processor circuit is further configured to activate a receiver associated with the BAN link responsive to transmitting the key to the peripheral device over the first communication link, listen on the BAN link to receive the key from the peripheral device, and determine that both the wireless communication device and the peripheral device are in contact with the body of the user responsive to receiving the key over the BAN link during a predetermined time interval.

In one embodiment, the processor circuit is further configured to request the unique identifier from the peripheral device if both the wireless communication device and the peripheral device are in contact with the user's body.

In one embodiment, the wireless communication device also comprises a memory circuit (30) operatively coupled to the processor circuit. To generate the key, the processor circuit is further configured to input a hardware identifier received from the peripheral device into a predefined hash function, and store a hash code output by the hash function as the key in the memory circuit.

In one embodiment, the second communication link comprises a Body Area Network (BAN) link that uses the user's body as a transmission medium, and the processor circuit is further configured to send a request to the peripheral device to ping the wireless communication device over the BAN link, receive the ping from the peripheral device over the BAN link, and determine that both the wireless communication device and the peripheral device are in contact with the user's body responsive to receiving the ping.

In one embodiment, the processor circuit is further configured to prompt the user to indicate whether to pair with the peripheral device responsive to receiving the ping, and send the key to the peripheral device if the user indicates to pair with the peripheral device using the BAN.

In one embodiment, the processor circuit is further configured to send one or more commands over the BAN link to selectively enable and disable a BAN transmitter at the peripheral device.

In one embodiment, the wireless communication device further comprises a display. In such embodiments, the processor circuit is further configured to display a passcode lock screen to the user, and bypass the passcode lock screen responsive to determining that both the wireless communication device and the peripheral device are in contact with the user's body.

In addition to the above, the present disclosure also provides a method for pairing a wireless communication device with a peripheral device using a Body Area Network (BAN). The method is performed at the peripheral device and comprises determining (64) whether both a wireless communication device and a peripheral device are in contact with a user's body, and pairing with the wireless communication device using a Body Area Network (BAN) if both the wireless communication device and the peripheral device are in contact with the user's body.

In one embodiment, the method further comprises pinging the wireless communication device over a second communication link responsive to receiving a request for the ping from the wireless communication device over a first communication link.

In one embodiment, the method further comprises transmitting a unique identifier to the wireless communication device over the first communication link, receiving a key from the wireless communication device over the first communication link, wherein the key is based on the unique identifier, storing the key in a memory circuit at the peripheral device, and transmitting the key to the wireless communication device over the second communication link.

In one embodiment, the second communication link comprises a Body Area Network (BAN) link that uses the user's body as a transmission medium.

In one embodiment, the method further comprises activating a BAN transmitter associated with the BAN link. In these cases, transmitting the key to the wireless communication device over the second communication link comprises transmitting the key over the BAN link at predetermined intervals.

In one embodiment, the method further comprises enabling or disabling the BAN transmitter responsive to receiving one or more commands from the wireless communication device.

The present disclosure also provides a peripheral device comprising a communications interface circuit and a processor circuit. In one embodiment, the communications interface circuit communicates with a wireless communication device proximate the peripheral device. The processor circuit determines whether both a wireless communication device and a peripheral device are in contact with a user's body, and pairs with the wireless communication device using a Body Area Network (BAN) if both the wireless communication device and the peripheral device are in contact with the user's body.

In one embodiment, the processor circuit is further configured to ping the wireless communication device over a second communication link responsive to receiving a request for the ping from the wireless communication device over a first communication link.

In another embodiment, the peripheral device further comprises a memory circuit. In these cases, the processor circuit is further configured to transmit a unique identifier to the wireless communication device over the first communication link, receive a key from the wireless communication device over the first communication link, wherein the key is based on the unique identifier, store the key in the memory circuit, and transmit the key to the wireless communication device over the second communication link.

In one embodiment, the second communication link comprises a Body Area Network (BAN) link that uses the user's body as a transmission medium.

In one embodiment further includes a BAN transmitter associated with the BAN link. In such cases, the processor circuit is further configured to activate the BAN transmitter, and transmit the key to the wireless communication device over the BAN link at predetermined intervals.

Of course, those skilled in the art will appreciate that the present invention is not limited to the above contexts or examples, and will recognize additional features and advantages upon reading the following detailed description and upon viewing the accompanying drawings.

DETAILED DESCRIPTION

The present disclosure provides a method for initializing and BAN pairing a user's wireless device with a peripheral device by employing the user's own body as a transmission medium for the signals and data required for pairing the devices. More particularly, the devices described herein can accurately detect whether each is in contact with the same user's body, and initiate BAN pairing with each other based on that determination. In doing so, the present disclosure provides a secure and reliable method in which to transmit the sometimes sensitive data required to BAN pair two devices.

Figure 1:
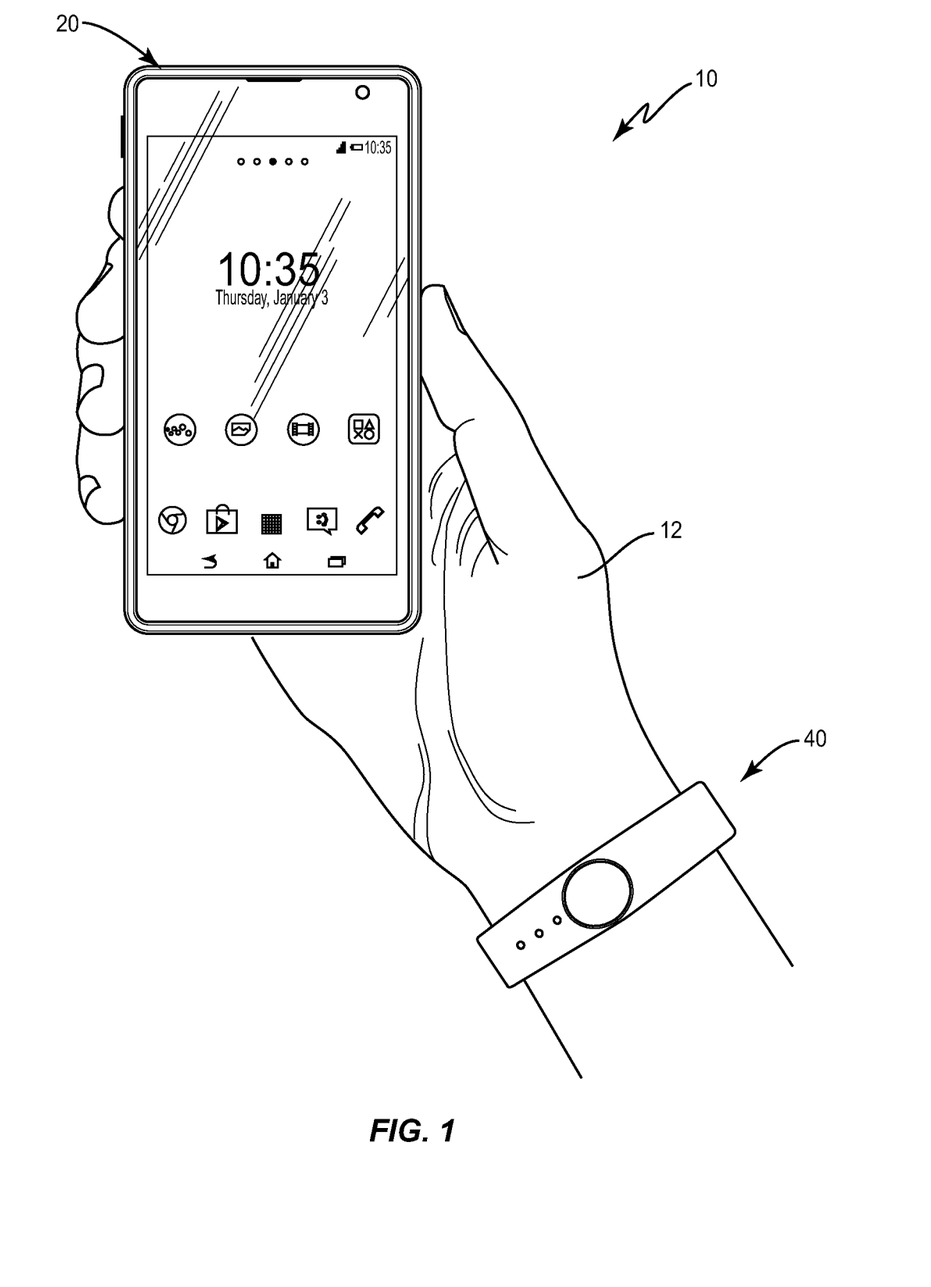
FIG. 1 is a perspective view illustrating two wireless devices configured to be BAN paired according to one embodiment of the present disclosure.

Turning to the drawings, FIG. 1 is a perspective view of a system 10 configured according to one embodiment. As seen in FIG. 1, system 10 comprises a pair of wireless devices 20, 40 associated with a user. The two devices are configured to pair with one another, and in this embodiment, comprise a cellular telephone 20 held in the user's hand 12, and a wearable device, such as a wristlet 40 worn around the wrist of the hand 12 that is holding the cellular telephone 20. As described in more detail later, both the cellular telephone 20 and the wristlet 40 comprise communication circuitry and corresponding software that enables the devices to establish communications links within, on, or in close proximity to the user's body, and to communicate the data and signals needed for pairing over those links.

More particularly, the cellular telephone 20 and the wristlet 40 (collectively, "devices 20, 40") establish communications links between them that allow the devices 20, 40 to communicate signals and data. Although the communications links may comprise an air interface that is external to, but proximate, the user's body, at least one communication link utilizes the user's own body as a transmission medium to carry the signals and data between the devices 20, 40. Such links—i.e., those links that are within or on the user's body—are referred to herein as "Body Area Network" (BAN) communication links or BAN links.

Body Area Networks (BANs), which may also be referred to as a "Wireless Body Area Networks" (WBANs), is a technology that utilizes low-power sensor circuitry disposed in and on a user's body to provide real-time monitoring of the user. Conventionally, this technology has been utilized for the real-time health monitoring patients and diagnosing their conditions and illnesses (e.g., diabetes monitoring, and the like); however, in this disclosure, the ability to communicate using a BAN link is utilized to securely communicate the signals and data that are needed to pair the devices 20, 40. More particularly, the user's own body (e.g., the user's hand) functions as a "connector" between the two devices 20, 40. So-connected, the devices 20, 40 will be able to detect one another's presence, as well as to transmit and receive tokens used in their pairing.

For the interested reader, BANs are fully described in the IEEE standard P802.15.6/D01 entitled, "Wireless Medium Access Control (MAC) and Physical Layer (PHY) Specifications for Wireless Personal Area Networks (WPANs) Used in or Around a Body." That standard, which was published in May, 2010, is incorporated herein for reference in its entirety.

Figure 2A:
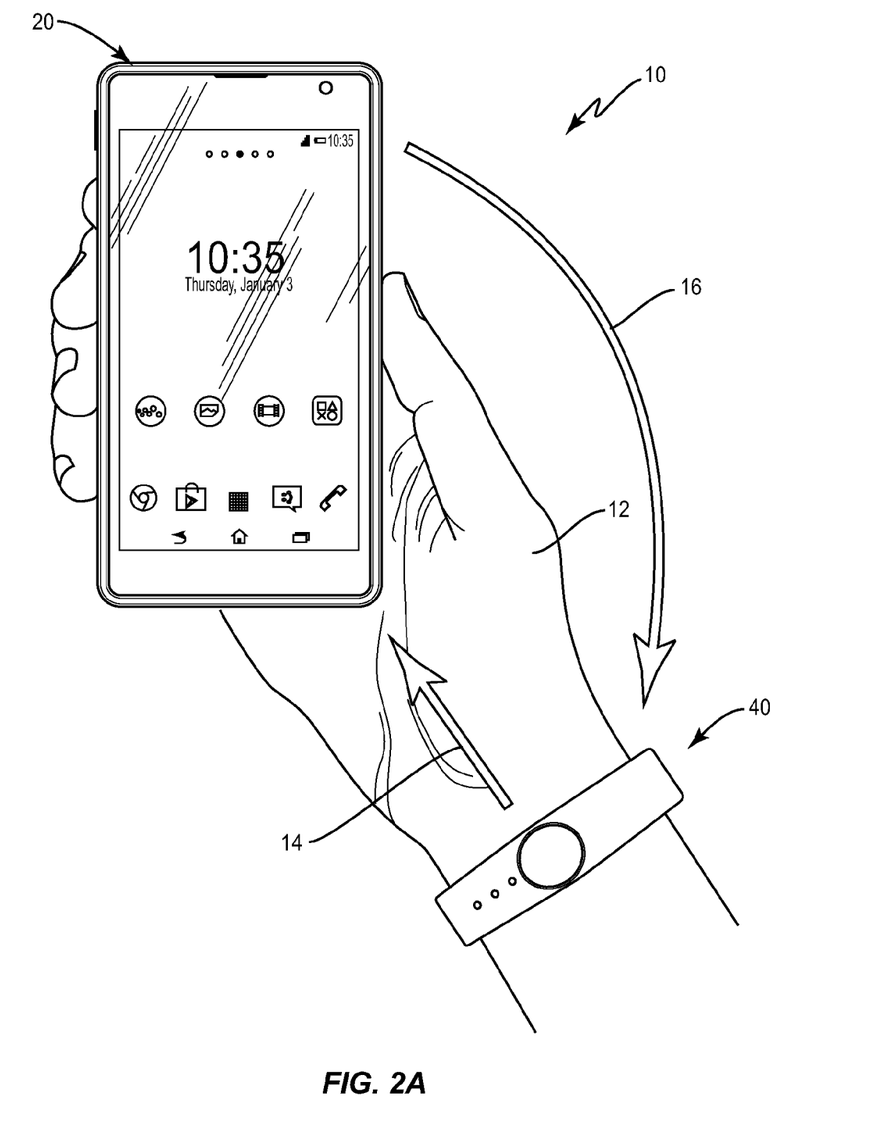
FIGS. 2A-2B are perspective views illustrating two wireless devices being BAN paired according to embodiments of the present disclosure.
Figure 2B:
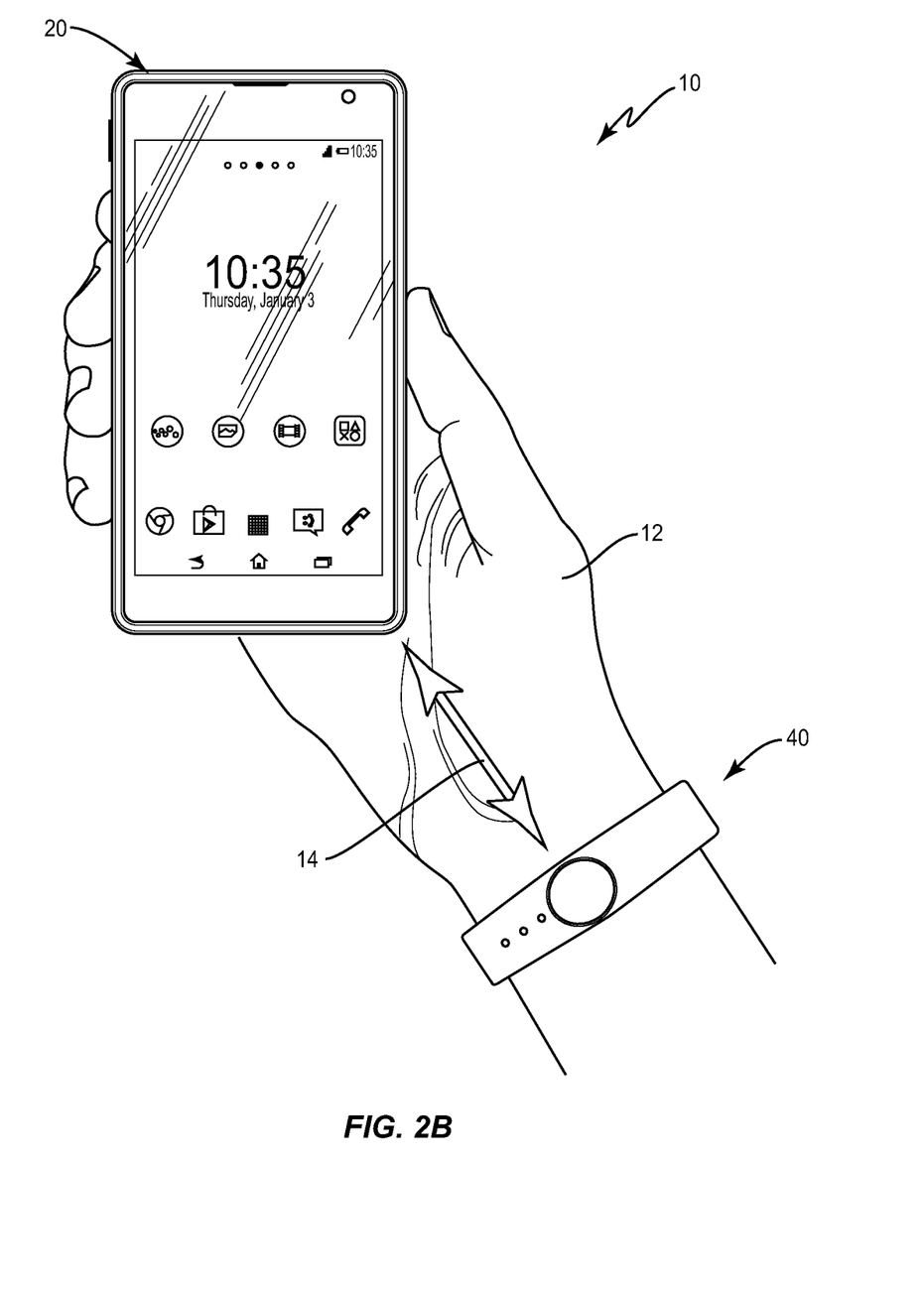

The present disclosure provides different methods for pairing the cellular telephone 20 with the wristlet 40; however, as those of ordinary skill in the art will appreciate, other methods not specifically described herein are also possible. Further, all methods employ bi-directional communications between the wristlet 40 and the cellular telephone 20. For example, as seen in FIG. 2A, the devices 20, 40 employ the user's body as a transmission medium for only one of the communication links, and another wireless technology (e.g., BLUETOOTH/BLE, WiFi, NFC, etc.) as a transmission medium for the other link. In such cases, the wristlet 40 may represent a BAN transmitter, while the cellular telephone 20 represents a BAN receiver. Only certain signals and data might be transmitted through the user's own body via a BAN communications link 14, while other signals and data are transmitted externally to, but proximate, the user's body via an air interface link 16. However in other embodiments, such as that seen in FIG. 2B, devices 20, 40 employ the user's body as the transmission medium two-way communications. Thus, BAN link 14 may, in some embodiments, comprise a bi-directional BAN link.

Figure 3A:
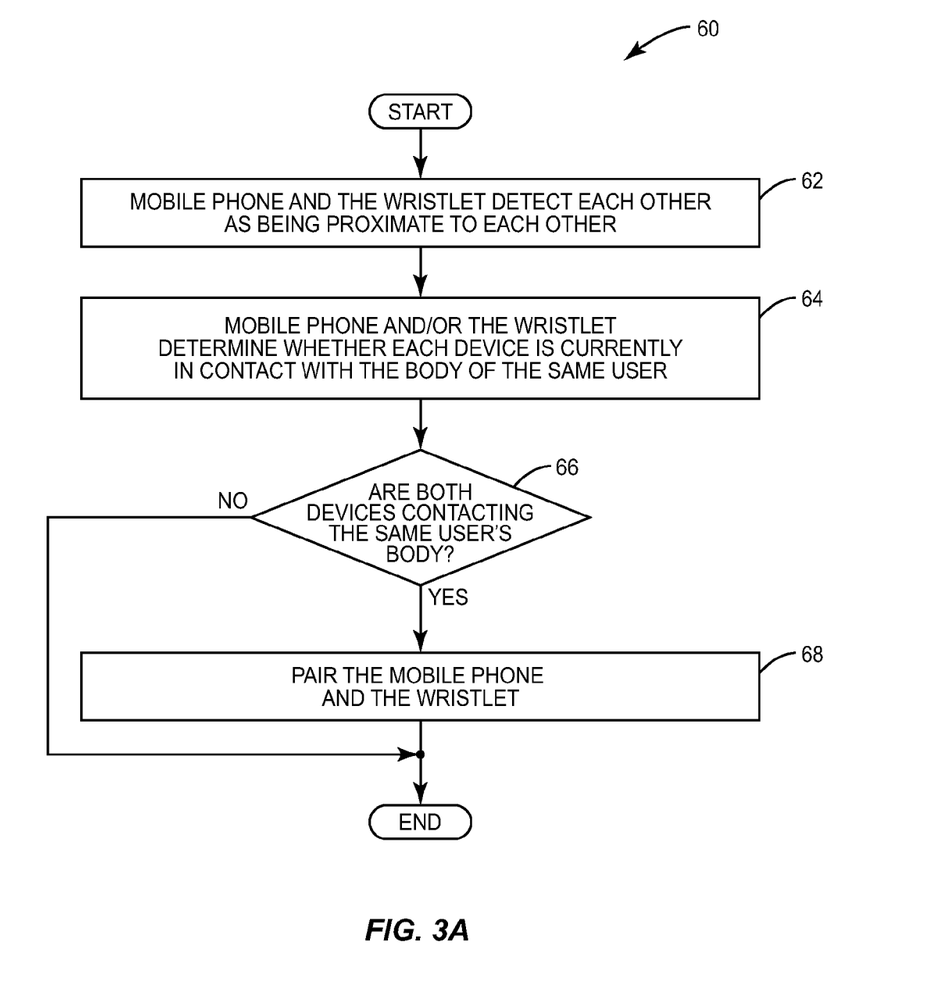
FIGS. 3A-3D are flow diagrams illustrating a method for BAN pairing two wireless devices according to embodiment of the present disclosure.

FIG. 3A illustrates a method 60 by which the cellular telephone 20 and the wristlet 40 seen in FIG. 2A are configured to BAN pair with each other according to one embodiment. Method 60 begins with the cellular telephone 20 and the wristlet 40 detecting each other as being proximate to each other (box 62). Such detection methods are well-known in the art of local connectivity, and as such, are not described in detail here. Once the two devices 20, 40 detect each other, one or both of the devices 20, 40 determines whether the other of the devices 20, 40 is currently in contact with the body of the same user (box 64). If it is determined that both devices 20, 40 are not currently in contact with the body of the same user (box 66), the method ends. If it is determined that both devices 20, 40 are currently in contact with the body of the user (e.g., the user that is wearing the wristlet 40 is also holding the cellular telephone 20 in his or her hand) (box 66), the devices 20, 40 will BAN pair with each other (box 68).

Figure 3B:
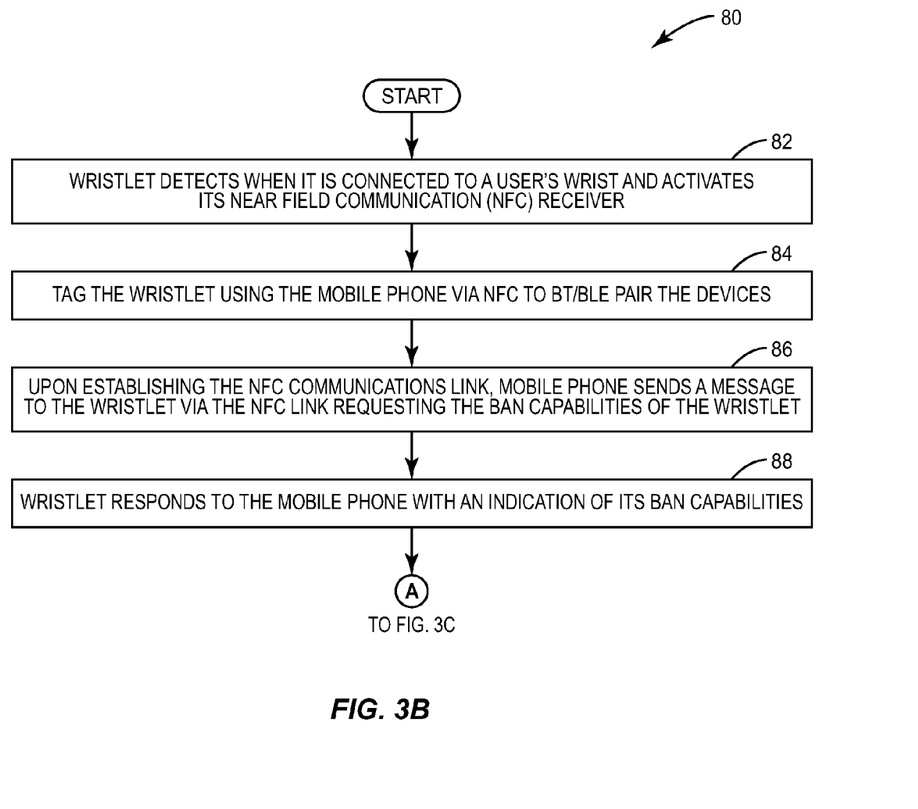
Figure 3C:
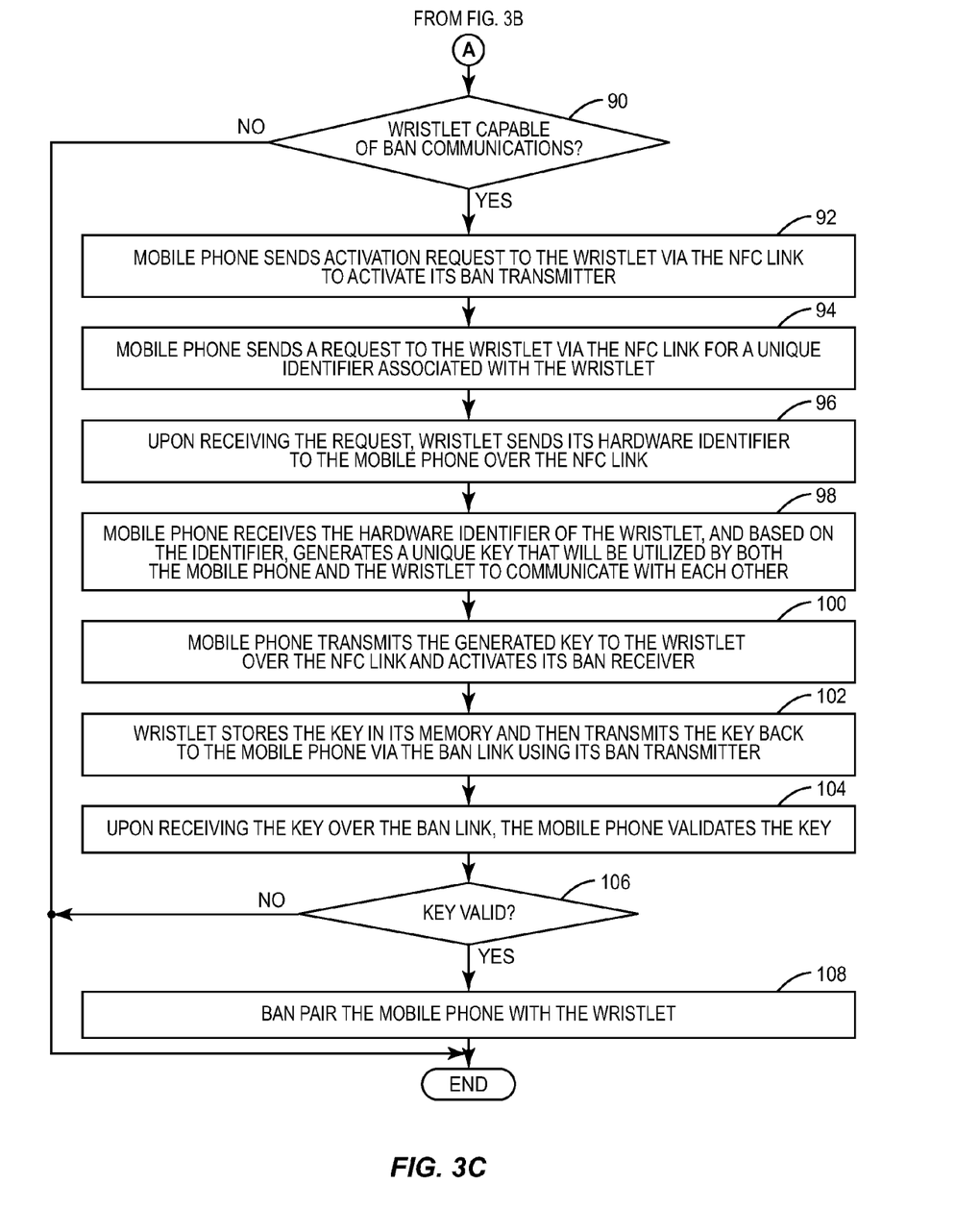

FIGS. 3B-3C illustrate a method 80 for BAN pairing the two devices 20, 40 in greater detail. As seen in FIG. 3B, method 80 begins with the user placing the wristlet 40 onto his/her wrist. In one embodiment, the wristlet 40 is configured to self-detect when it is secured to the user's wrist, and in response, activate its Near Field Communications (NFC) transceiver (box 82). Such self-detection for the wristlet 40 is described, for example, in U.S. Application Ser. No. 61/912,223 entitled "A Wearable Device and a Method for Storing Credentials Associated with at least One Electronic Device." The '223 application was filed on Dec. 5, 2013, and is incorporated herein by reference in its entirety.

By way of example, the wristlet 40 may comprise a sensor that contacts the user's skin when the wristlet 40 is placed on the user's wrist. Since it may be difficult to distinguish whether the wristlet 40 is on the user's wrist or on some other part of the user's body, the sensor may comprise a component configured to detect tremors in the user's body. Particularly, human muscles have a tremor commonly referred to as "the 8-12 Hz component." Therefore, the sensor utilized for wristlet 40 may comprise an accelerometer configured to detect such tremors within this frequency range. Note, however, that the wristlet 40 is not limited to the use of accelerometers for the sensor. Rather, other methods of self-detection are also possible. For example, wristlets 40 in other embodiments of the present disclosure utilize sensors configured to detect the user's pulse, blood flow, temperature, and the like.

Once the wristlet 40 activates its NFC transceiver, a corresponding NFC transceiver at the cellular telephone 20 can establish an NFC link (i.e., air interface link 16) with the NFC transceiver at wristlet 40. Particularly, the user may place the cellular telephone 20 within close proximity of the wristlet 40 (e.g., within a few millimeters distance) to tag the wristlet (box 84). Tagging the wristlet 40 "BT/BLE pairs" the devices 20, 40—that is, the tagging causes the two devices 20, 40 to pair with each other over the air interface link 16, as opposed to BAN pairing which occurs over the BAN link 14.

Once the devices 20, 40 are BT/BLE paired and the air interface link 16 is established, the cellular telephone 20 can determine whether the wristlet 40 is also in contact with the same user's body. In this embodiment, the cellular telephone 20 sends a request to the wristlet 40 over the air interface link 16 requesting that the wristlet 40 indicate its BAN capabilities, if any, to the cellular telephone 20 (box 86), to which the wristlet 40 responds (box 88). As seen in FIG. 3C, if the wristlet 40 indicates that it is not capable of BAN communications (box 90), the method 80 ends. However, if the wristlet 40 indicates (box 90) that it is capable of communicating with the cellular telephone 20 over the user's body (i.e., using the BAN link 14), the cellular telephone 20 sends an activation request to the wristlet 40 via the air interface link 16 requesting that the wristlet 40 activate its BAN transceiver (box 92).

The cellular telephone 20 then sends another request to the wristlet 40, again via the air interface link 16, requesting that the wristlet 40 provide the cellular telephone 20 with a unique identifier (box 94). The cellular telephone 20 may then activate its own BAN receiver. Upon receipt of the request, wristlet 40 obtains a unique identifier from its memory, for example, and sends that identifier to the cellular telephone 20 over the BAN link 16 (box 96). The unique identifier sent by the wristlet 40 may be any unique indicator needed or desired. However, in one embodiment, the unique identifier comprises a hardware identifier for the wristlet 40.

Upon receiving the unique identifier from wristlet 40, cellular telephone 20 uses the identifier to generate a unique key that will be shared between the cellular telephone 20 and the wristlet 40 and used for communications between the two devices 20, 40 (box 98). For example, in one embodiment, cellular telephone 20 inputs the hardware identifier received from wristlet 40 into a hash function. The output of the hash function is the unique key that both the cellular telephone 20 and the wristlet 40 will utilize to communicate with each other over one or both of the BAN link 14 and the air interface link 16.

Once generated, the cellular telephone 20 stores the key in its memory circuit and sends the key back to the wristlet 40 via the air interface link 16 (box 100). The wristlet 40 stores the key in its memory circuit and transmits the key it just received over the air interface link 16 to cellular telephone 20 over BAN link 14 (box 102). After receiving the key from wristlet 40 over BAN link 14, cellular telephone 20 may validate the key (box 104). For example, if the BAN receiver at cellular telephone 20 receives the key on the BAN link 14 within a predefined time period, the cellular telephone 20 may compare the received key to the key it previously stored in its memory circuit. If the two keys match (box 106), the key received from the wristlet 40 over BAN link 14 is deemed valid, and the cellular telephone 20 and wristlet 40 can BAN pair (box 108). Otherwise, if the cellular telephone does not receive the key on the BAN link 14 within the predefined time period or if the keys do not match, the method 60 ends without the devices being BAN paired.

It should be noted that in some embodiments, the cellular telephone 20 may activate its BAN receiver only when needed to conserve energy resources. For example, in one embodiment, the cellular telephone 20 may be configured to activate its BAN receiver responsive to sending the key to the wristlet 40 over the first communication link. Once activated, the cellular telephone 20 will listen to receive the key over the BAN link from the wristlet 40. If the key is received within a predetermined time, the cellular telephone 20 can validate the key.

Figure 3D:
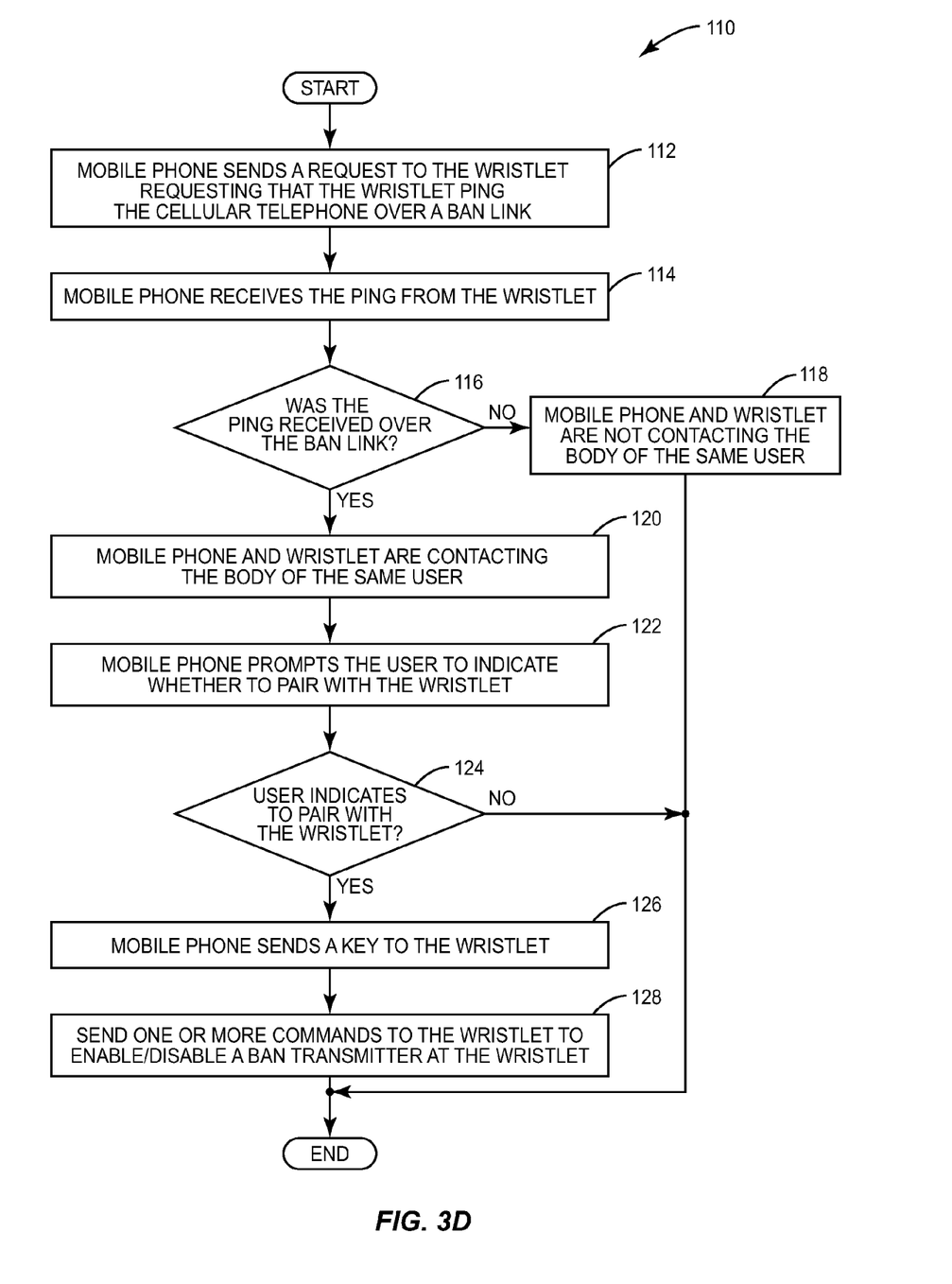

FIG. 3D illustrates a method 110 in which the cellular telephone 20 can determine whether the wristlet 40 is in contact with the body of the same user in accordance with one embodiment. Method 110 assumes that the cellular telephone 20 has detected the presence of the wristlet 40.

Method 110 begins with the cellular telephone 20 sending a request to the wristlet 40 to request that the wristlet 40 "ping" the cellular telephone 20 over a BAN link (box 112). Such a ping may comprise, for example, any signal or data sent by the wristlet 40. The cellular telephone 20 listens on the BAN link for the ping (box 114). If the cellular telephone 20 does not receive the ping over the specified BAN link (box 116), the cellular telephone can determine that the wristlet 40 is not in contact with the body of the same user that is holding the cellular telephone 20 (box 118) and the method ends. If the cellular telephone 20 does receive the ping over the specified BAN link, however (box 116), the cellular telephone determines that the wristlet 40 is in contact with the same user that is holding the cellular telephone 20 (box 120). The cellular telephone 20, in one embodiment, then displays a prompt to the user prompting him/her to indicate whether the cellular telephone should or should not BAN pair with the wristlet 40 (box 122). If the user indicates that the cellular telephone 20 should not BAN pair with the wristlet 40 (box 124), the method ends. Otherwise, the mobile phone sends a key to the wristlet 40 (box 126). The wristlet 40, upon request, will then send the key back to the cellular telephone 20, as previously described.

By way of example only, consider a cellular telephone 20 that displays a passcode screen to a user whenever the user wishes to access the cellular telephone functions. Conventionally, a user would have to manually input a predefined passcode to unlock the cellular telephone 20 each time the user wanted to unlock the cellular telephone 20. With the method described above, however, wristlet 40 would BAN pair with the cellular telephone 20, and would simply send the key to the cellular telephone 20 responsive to a request for the key. A valid key would cause the cellular telephone 20 simply unlock, thereby allowing the user of the cellular telephone 20 to bypass the passcode screen. Alternatively, the method of the present disclosure may be configured to allow the user to bypass the passcode screen based on the determination that both devices 20, 40 are in contact with the body of the same user, and on the determination that the wristlet 40 has provided the cellular telephone 20 the proper key via the BAN link 14.

Once the cellular telephone 20 and the wristlet 40 are BAN paired, the two devices 20, 40 may communicate any type of data needed or desired. For example, in one embodiment, the cellular telephone 20 can control the transmission of data by the wristlet 40 by selectively enabling and disabling a BAN transmitter at the wristlet 40 (box 128). Particularly, the cellular telephone 20 can be configured to generate and send signals or commands to the wristlet 40 via the air interface link 16 or the BAN link 14. Upon receipt, the wristlet 40 would either enable or disable its transmitter in accordance with the received signals. In this manner, the cellular telephone 20 can help to conserve power resources at wristlet 40.

Such functions are beneficial, for example, whenever communications between the two devices 20, 40 are completed or have been idle for some predetermined time. However, those of ordinary skill in the art should appreciate that sending explicit commands or signals are not required for the present disclosure. In another embodiment, for example, the wristlet 40 is configured to detect when a communications function has been completed, such as when a user has successfully logged onto cellular telephone 20. Upon such detection, the wristlet 40 may be configured to autonomously disable its transmitter(s), thereby stopping communications with cellular telephone 20. To re-establish communications, the wristlet 40 need only to provide the key it stored in its memory to the cellular telephone 20. If valid, the cellular telephone 20 can once again communicate with the wristlet 40. Alternatively, the process of establishing the BAN links 14, 16 and pairing the two devices 20, 40, as previously described, may be repeated.

It should be noted that the previously described embodiments illustrate only one of the links as using the user's body as a transmission medium. However, this is for illustrative purposes only. Any of the embodiments described herein may be configured to employ the user's body as a transmission medium for communication in both directions (i.e., a b-directional BAN link 14). In such embodiments, both the cellular telephone 20 and the wristlet 40 could comprise corresponding BAN transceivers, and thus, communicate all signals and data via a bi-directional BAN link 14.

Figure 4:
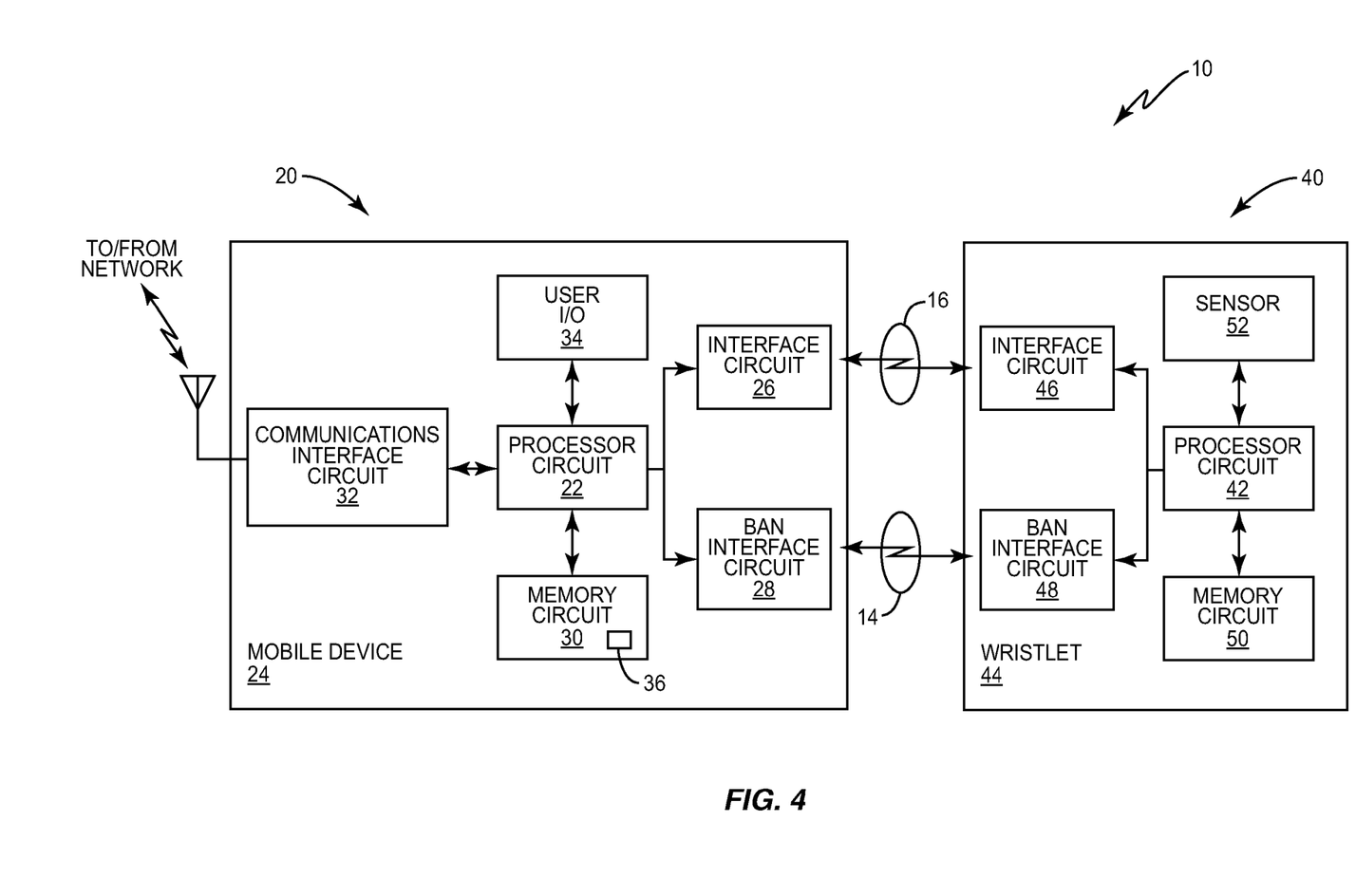
FIG. 4 is a block diagram illustrating some component circuits that comprise two wireless devices configured to be BAN paired according to one embodiment.

FIG. 4 is a block diagram illustrating some of the components of the two devices that comprise system 10—i.e., the cellular telephone 20 and the wristlet 40. Cellular telephone 20 comprises a processor circuit 22, a BAN communications interface circuit 24, a memory 30, a communications interface circuit 32, and a User Input/Output interface 36.

Processor circuit 22 comprises an electronics circuit configured to generally control the operation of the cellular telephone 20 according to programs and data stored in memory 30. Such programs and data include, but are not limited to, logic and instructions that, when executed by the processor circuit 22, control the establishment of BAN link 14 and air interface link 16. The programs and data may also configure the processing circuit 22 to generate the unique keys from the identifiers sent by the wristlet 40, whether and how the cellular telephone 20 pairs with the wristlet 40, and how the cellular telephone 20 can enable and/or disable the transmitter(s) at wristlet 40. Processing circuit 22 may be implemented, for example, in a single microprocessor, or in multiple microprocessors. Suitable microprocessors may include general purpose and special purpose microprocessors, as well as digital signal processors.

The BAN communications interface circuit 24 comprises a first BAN interface circuit 26 and a second BAN interface circuit 28. Each of these circuits 26, 28 may comprise, for example, a transmitter, a receiver, or both (i.e., a transceiver) controlled to communicate with a corresponding circuit 46, 48 at the wristlet 40. In one embodiment, both circuits 26, 28 are configured to transmit signals and data using the user's own body as a transmission medium. In other embodiments, one of the circuits 24, 26 comprises an NFC transmitter/receiver (or a transmitter/receiver operating according to some other protocol such as BLUETOOTH), for example, while the other of two circuits 26, 28 comprises a transmitter/receiver that communicates signals and data via the BAN link 14 within or on the user's body.

Memory circuit 30 is a computer readable medium representing the entire hierarchy of memory in, or accessible to, cellular telephone 20. Memory 30 may comprise both random access memory (RAM) and read-only memory (ROM), and may be implemented, for example, as one or more discrete devices, stacked devices, or removable devices, such as a flash drive or memory stick. In one embodiment, the memory 30 may be integrated with processor circuit 22. As previously stated, memory circuit 30 may store programs 36 responsible for controlling the operation of cellular telephone 20, as well as the unique identifiers received from wristlet 40 and the unique keys generated based on those unique identifiers.

The communications interface circuit 32 may comprise any transceiver for transmitting and receiving data, such as downloaded video and/or audio content, for example, to and from a base station in a wireless communications network. Thus, in one embodiment, the communications interface circuit 32 comprises a fully functional cellular radio transceiver that operates according to any known standard. Such standards include, but are not limited to, the Global System for Mobile Communications (GSM), TIA/EIA-136, cdmaOne, cdma2000, UMTS, WiFi, and Wideband CDMA.

The User I/O interface 34 provides a user with the necessary components to interact with the cellular telephone 20. Typically, the UI 34 includes a display, a speaker, a microphone, and a variety of controls, which may include, but is not limited to, a keypad or buttons. In one embodiment, the processing circuit 22 controls the UI 34 to display a prompt to the user to indicate whether the user wishes to pair the cellular telephone 20 to wristlet 40.

Wristlet 40 also comprises a variety of components including, but not limited to, a processor circuit 42, a BAN communications interface circuit 44, a memory circuit 50, and a sensor 52. The processor circuit 42 may also comprise an electronics circuit configured to generally control the operation of the wristlet 40 according to programs and data stored in memory 50. Such programs and data include, but are not limited to, logic and instructions that, when executed by the processor circuit 42, control the establishment of BAN link 14 or air interface link 16. The programs and data may also configure the processing circuit 42 to retrieve and send the unique identifier (e.g., the hardware identifier of wristlet 40) to the cellular telephone 20, as well as to store the key generated by the cellular telephone 20 in memory 50, and send the key to the cellular telephone 20 via BAN link 14 or air interface link 16. As above, the processing circuit 42 may be implemented, for example, in a single microprocessor, or in multiple microprocessors. Suitable microprocessors may include general purpose and special purpose microprocessors, as well as digital signal processors.

The BAN communications interface 44 also comprises a pair of BAN interface circuits 46, 48. Like circuits 26, 28 in cellular telephone 20, one or both of the BAN interface circuits 46, 48 may comprise, for example, a transmitter, a receiver, or both (i.e., a transceiver). Further, the circuits 46, 48 may be controlled to communicate with the corresponding circuits 26, 28 at the cellular telephone 20. In one embodiment, both circuits 46, 48 are configured to transmit signals and data using the user's own body as a transmission medium. In other embodiments, however, one of the circuits 46, 48 comprises an NFC transmitter/receiver (or a transmitter/receiver operating according to some other protocol such as BLUETOOTH or WiFi), for example, while the other of the two circuits 46, 48 comprises a transmitter/receiver that communicates signals and data via the BAN link 14 within or on the user's body.

Memory circuit 50 is a computer readable medium representing the entire hierarchy of memory in, or accessible to, wristlet 40. Memory 50 may comprise both random access memory (RAM) and read-only memory (ROM), and may be implemented, for example, as one or more discrete devices, stacked devices, or removable devices, such as a flash drive or memory stick. In one embodiment, the memory 50 may be integrated with processor circuit 42. As previously stated, memory circuit 50 may store the logic and instructions responsible for controlling the operation of wristlet 40, as well as for storing the unique keys generated based on the unique identifiers associated with wristlet 40.

The sensor 52 can be any sensor known in the art configured to detect when the wristlet is secured to the user's wrist. In one embodiment, such a sensor may comprise a "tremor sensor" configured to detect the tremors present in human muscles. As stated previously, such sensors are able to sense tremors within the 8-12 Hz range. However, other sensors are also possible, such as those that are configured to detect body temperature, blood flow, and pulse, for example. As stated above, signals coming from sensor 52 may be received at the processor circuit 42, and used as a trigger to activate one or both of the BAN interface circuits 46, 48 and establish BAN link 14 and/or 16.

Those of ordinary skill in the art should readily appreciate that the present disclosure is not limited to pairing a cellular telephone 20 and a wristlet 40, but rather, may be implemented to pair other devices in addition to, or in lieu of, devices 20, 40. For example, the wristlet 40 need not comprise a wristlet, but rather, may be embodied as any wearable device, such as a ring or necklace, for example.

Figure 5A:
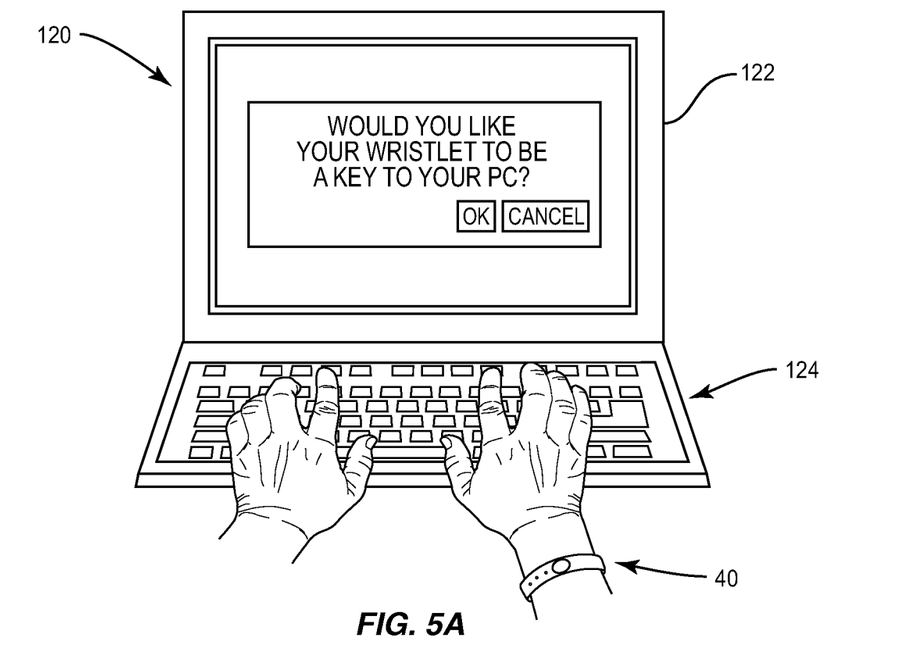
FIGS. 5A-5D are perspective views illustrating other types of wireless devices configured to be BAN paired according to one or more embodiments of the present disclosure.

FIG. 5A illustrates a system 120 in which the wristlet 40 allows the user to communicate with a computing device 122, and more particularly, the keyboard 124, via one or both of the BAN links 14, 16. In this embodiment, the wristlet 40 and the computing device 122 pair with each other upon detecting that the user wearing the wristlet 40 is also touching the keyboard 124. In accordance with the methods described above, the user could unlock the keyboard using the wristlet 40, and once unlocked, utilize the computing device to perform any known function. The wristlet 40, however, could be used so as to restrict use of the computing device to certain users having a wristlet 40 identified by a given identifier.

Figure 5B:
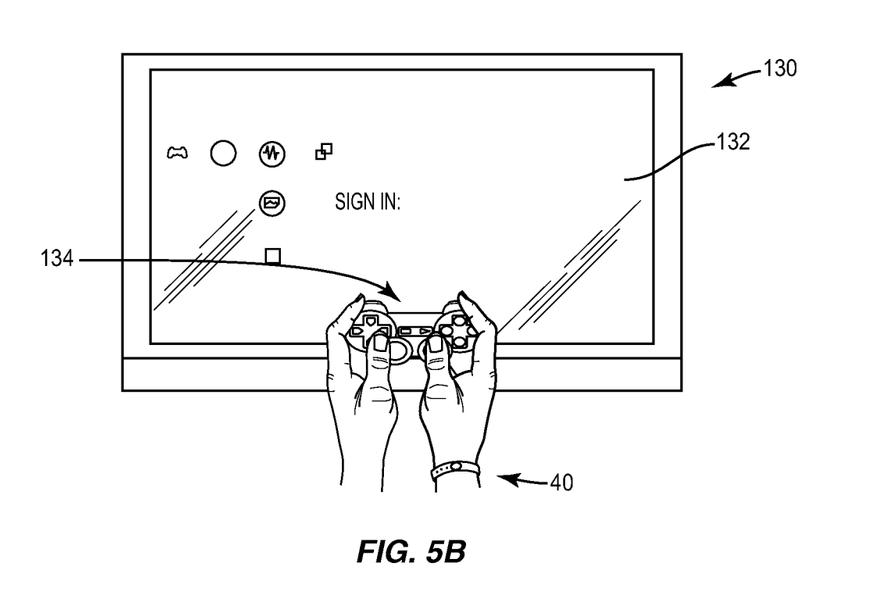

FIG. 5B illustrates another embodiment in which the wristlet 40 is configured to allow a user to access and use a game system 130 having a display 132. Particularly, the wristlet 40 BAN pairs with the hand held controller 134, and as a result of the pairing, permits the user to access and use the game system 130. In one embodiment, the user wearing wristlet 40 may automatically log into a game or on-line system, for example, whenever the controller 134 and the wristlet 40 are in contact with the body of the same user, as described in the previous embodiments.

Figure 5C:
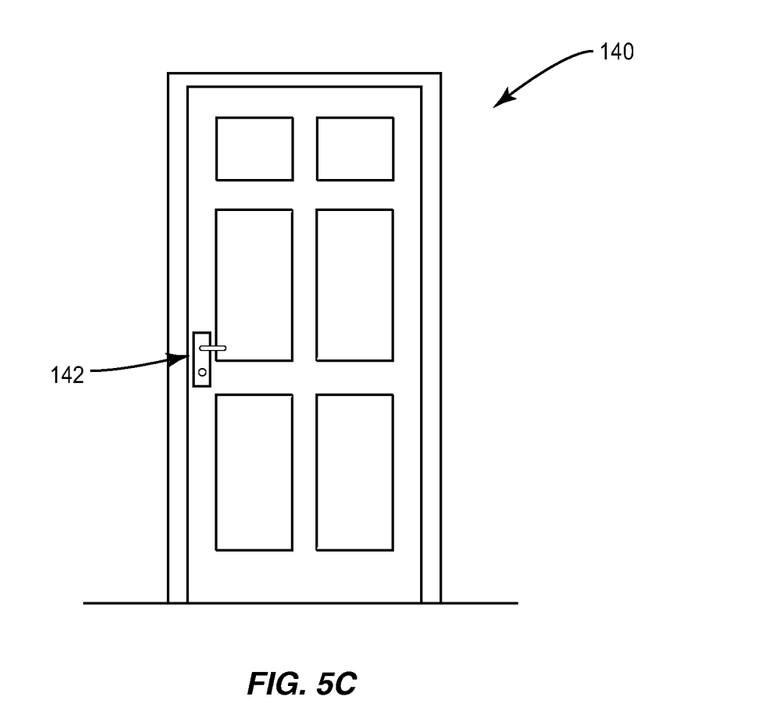

Similarly, as seen with the system 140 in FIG. 5C, the wristlet 40 may be configured to facilitate access for a user into a locked room. In these embodiments, the wristlet 40 could be configured to BAN pair with the door handle 142, for example, when the user grabs the handle to gain entry. Provided entry is permitted, the door would be unlocked to allow the user in the room. Otherwise, the door would remain locked and the user would be denied entry.

Figure 5D:
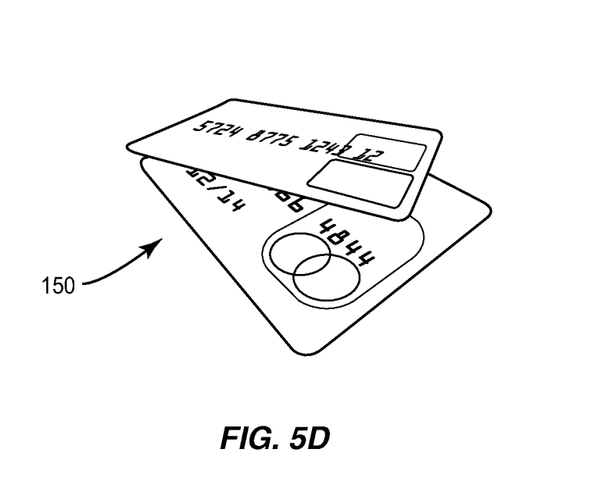

In yet another embodiment, seen in FIG. 5D, the wristlet 40 may be used to facilitate a payment by the user. In this embodiment, a credit card 150 or similar financial vehicle would only be validated for use by a downstream server, for example, if the person "swiping" the card to effect payment is the person that owns the card. In one embodiment, such "ownership" may be determined responsive to detecting that the user swiping the card 140 is also the user wearing the wristlet 40. Thus, the wristlet 40, in this embodiment, would communicate and pair with the card 150 so long as the user wore the wristlet 40 on his/her wrist and touched the card.

The present invention may, of course, be carried out in other ways than those specifically set forth herein without departing from essential characteristics of the invention. As described above, the present disclosure is not limited to BAN pairing a cellular telephone 20 and a wristlet 40, but rather, may be implemented to pair other devices as well. Accordingly, the present embodiments are to be considered in all respects as illustrative and not restrictive, and all changes coming within the meaning and equivalency range of the appended claims are intended to be embraced therein.

What is claimed is:

1. A method for pairing a wireless communication device with a peripheral device using a Body Area Network (BAN), the method performed at the wireless communication device and comprising:
   detecting that a peripheral device is proximate a wireless communication device;
   determining whether both the wireless communication device and the peripheral device are in contact with a user's body, wherein the determining comprises:
      using the user's body as a transmission medium to:
         send a request to the peripheral device to ping the wireless communication device;
         receive the ping from the peripheral device; and
      determining that both the wireless communication device and the peripheral device are in contact with the user's body responsive to receiving the ping; and
   BAN-pairing with the peripheral device using the user's body as a transmission medium responsive to determining that both the wireless communication device and the peripheral device are in contact with the user's body.

2. The method of claim 1 wherein BAN-pairing with the peripheral device using the user's body as a transmission medium responsive to determining that both the wireless communication device and the peripheral device are in contact with the user's body comprises:
   generating a key based on a unique identifier received over a first communication link from the peripheral device;
   transmitting the generated key to the peripheral device over the first communication link;
   receiving the key from the peripheral device over a second communication link; and
   pairing with the peripheral device if the key received over the second communication link is a valid key.

3. The method of claim 2 wherein the second communication link comprises a Body Area Network (BAN) link that uses the user's body as a transmission medium.

4. The method of claim 3 further comprising:
   activating a receiver associated with the BAN link responsive to transmitting the key to the peripheral device over the first communication link;
   listening on the BAN link to receive the key from the peripheral device; and
   determining that both the wireless communication device and the peripheral device are in contact with the body of the user responsive to receiving the key over the BAN link during a predetermined time interval.

5. The method of claim 2 wherein the second communication link comprises a Body Area Network (BAN) link that uses the user's body as a transmission medium.

6. The method of claim 5 further comprising:
   prompting the user to indicate whether to BAN-pair with the peripheral device responsive to receiving the ping; and
   sending the key to the peripheral device if the user indicates to BAN-pair with the peripheral device.

7. The method of claim 2 wherein the unique identifier comprises a hardware identifier associated with the peripheral device, and wherein generating the key comprises:
   inputting the hardware identifier into a predefined hash function; and
   storing a hash code output by the hash function as the key in a memory circuit at the wireless communication device.

8. The method of claim 3 further comprising sending one or more commands over the BAN link to selectively enable and disable a BAN transmitter at the peripheral device.

9. The method of claim 1 further comprising requesting the unique identifier from the peripheral device if both the wireless communication device and the peripheral device are in contact with the user's body.

10. The method of claim 1 wherein the wireless communication device is configured to display a passcode lock screen to the user, and further comprising bypassing the passcode lock screen responsive to determining that both the wireless communication device and the peripheral device are in contact with the user's body.

11. A wireless communication device configured to pair with a peripheral device using a Body Area Network (BAN), the wireless communication device comprising:
   a communications interface circuit configured to communicate data and signals with a peripheral device disposed proximate the wireless communication device; and
   a processor circuit configured to:
      determine whether both the wireless communication device and the peripheral device are in contact with a user's body by:
         using the user's body as a transmission medium to:
            send a request to the peripheral device to ping the wireless communication device; and
            receive the ping from the peripheral device; and
         determine that both the wireless communication device and the peripheral device are in contact with the user's body responsive to receiving the ping; and
      BAN-pair with the peripheral device using the user's body as a transmission medium responsive to determining that both the wireless communication device and the peripheral device are in contact with the user's body.

12. The wireless communication device of claim 11 wherein to BAN-pair with the peripheral device using the user's body as a transmission medium, the processor circuit is configured to:
   generate a key based on a unique identifier received over a first communication link from the peripheral device;
   transmit the generated key to the peripheral device over the first communication link;
   receive the key from the peripheral device over a second communication link; and
   pair with the peripheral device if the key received over the second communication link is a valid key.

13. The wireless communication device of claim 12 wherein the second communication link comprises a Body Area Network (BAN) link that uses the user's body as a transmission medium.

14. The wireless communication device of claim 13 wherein the processor circuit is further configured to:
   activate a receiver associated with the BAN link responsive to transmitting the key to the peripheral device over the first communication link;
   listen on the BAN link to receive the key from the peripheral device; and
   determine that both the wireless communication device and the peripheral device are in contact with the body of the user responsive to receiving the key over the BAN link during a predetermined time interval.

15. The wireless communication device of claim 12 wherein the second communication link comprises a Body Area Network (BAN) link that uses the user's body as a transmission medium.

16. The wireless communication device of claim 15 wherein the processor circuit is further configured to:
prompt the user to indicate whether to BAN-pair with the peripheral device responsive to receiving the ping; and
send the key to the peripheral device if the user indicates to BAN-pair with the peripheral device using the user's body as a transmission medium.

17. The wireless communication device of claim 12 further comprising a memory circuit operatively coupled to the processor circuit, and wherein to generate the key, the processor circuit is further configured to:
input a hardware identifier received from the peripheral device into a predefined hash function; and
store a hash code output by the hash function as the key in the memory circuit.

18. The wireless communication device of claim 13 wherein the processor circuit is further configured to send one or more commands over the BAN link to selectively enable and disable a BAN transmitter at the peripheral device.

19. The wireless communication device of claim 11 wherein the processor circuit is further configured to request the unique identifier from the peripheral device if both the wireless communication device and the peripheral device are in contact with the user's body.

20. The wireless communication device of claim 11 further comprising a display, and wherein the processor circuit is further configured to:
display a passcode lock screen to the user; and
bypass the passcode lock screen responsive to determining that both the wireless communication device and the peripheral device are in contact with the user's body.

21. A method for pairing a wireless communication device with a peripheral device using a Body Area Network (BAN), the method performed at the peripheral device and comprising:
determining whether both a wireless communication device and a peripheral device are in contact with a user's body, wherein the determining comprises pinging the wireless communication device over a second communication link responsive to receiving a request for the ping from the wireless communication device over a first communication link, and wherein the second communications link comprises a BAN link that uses the user's body as a transmission medium; and
BAN-pairing with the wireless communication device using the user's body as a transmission medium responsive to determining that both the wireless communication device and the peripheral device are in contact with the user's body.

22. The method of claim 21 further comprising:
transmitting a unique identifier to the wireless communication device over the first communication link;
receiving a key from the wireless communication device over the first communication link, wherein the key is based on the unique identifier;
storing the key in a memory circuit at the peripheral device; and
transmitting the key to the wireless communication device over the second communication link.

23. The method of claim 21 further comprising activating a BAN transmitter associated with the BAN link, and wherein transmitting the key to the wireless communication device over the second communication link comprises transmitting the key over the BAN link at predetermined intervals.

24. The method of claim 23 further comprising enabling or disabling the BAN transmitter responsive to receiving one or more commands from the wireless communication device.

25. A peripheral device configured to pair with a wireless communication device using a Body Area Network (BAN), the peripheral device comprising:
a communications interface circuit configured to communicate with a wireless communication device proximate the peripheral device;
a processor circuit configured to:
determine whether both a wireless communication device and a peripheral device are in contact with a user's body by pinging the wireless communication device over a second communication link responsive to receiving a request for the ping from the wireless communication device over a first communication link, wherein the second communications link comprises a BAN link that uses the user's body as a transmission medium; and
BAN-pair with the wireless communication device using the user's body as a transmission medium responsive to determining that both the wireless communication device and the peripheral device are in contact with the user's body.

26. The peripheral device of claim 25 further comprising a memory circuit, and wherein the processor circuit is further configured to:
transmit a unique identifier to the wireless communication device over the first communication link;
receive a key from the wireless communication device over the first communication link, wherein the key is based on the unique identifier;
store the key in the memory circuit; and
transmit the key to the wireless communication device over the second communication link.

27. The peripheral device of claim 25 further comprising a BAN transmitter associated with the BAN link, and wherein the processor circuit is further configured to:
activate the BAN transmitter; and
transmit the key to the wireless communication device over the BAN link at predetermined intervals.

* * * * *